United States Patent [19]

Ichii et al.

[11] Patent Number: 5,552,349
[45] Date of Patent: Sep. 3, 1996

[54] LOW THERMAL EXPANSION CORDIERITE AGGREGATE AND ITS BONDED BODY

[75] Inventors: Tomoko Ichii; Keiichiro Suzuki; Masataro Okumiya, all of Yokohama, Japan

[73] Assignee: AG Technology Co., Ltd., Yokohama, Japan

[21] Appl. No.: 289,280

[22] Filed: Aug. 11, 1994

[30] Foreign Application Priority Data

Aug. 11, 1993 [JP] Japan .................................. 5-219033

[51] Int. Cl.⁶ .................................................. C04B 35/04
[52] U.S. Cl. ........................... 501/9; 501/118; 501/119; 501/153
[58] Field of Search ........................... 501/9, 118, 119, 501/122, 153, 32

[56] References Cited

U.S. PATENT DOCUMENTS 3,926,648  12/1975  Miller .......................................... 501/9

(List continued on next page.)

FOREIGN PATENT DOCUMENTS 2533871  2/1976  Germany .................................. 501/9
0100409  8/1979  Japan .................................... 501/9

(List continued on next page.)

OTHER PUBLICATIONS

Ceramics, vol. 14, pp. 967–976 (1979), by Shigekazu Udagawa, et al., *Low Thermal Expansion Ceramics Thermal Expansion Of Crystals In Relation To Their Structure.*
Japanse Patent Abstract—"Cordierite Honeycomb Structure", Hamiguichi et al. JP 06–165939 (Jun. 14, 1994).
Japanese Patent Abstract—"Production of Low Heat Expansion Cordierite", Morinaga et al. JP 02–255566 (Oct. 16, 1990).

Japanese Patent Abstract—"Production of Low Expansion Ceramics" Watanabe et al. (Sep. 12, 1990) JP 02–229760.
Japanese Patent Abstract—"Filling Material For Semiconductor Sealing Use" Chiba et al. (Jul. 5, 1990) JP 02–174146.
Japanese Patent Abstract—"Purification Catalyst Carrier for Combustion Machinery" Yamada et al. JP 61–178038 (Aug. 9, 1986).
Japanese Patent Abstract—"Ceramic Honeycomb Filter" Higuchi et al., JP 57–42316 (Mar. 9, 1982).
Japanese Patent Abstract—"Cordierite Glass Ceramic Article and its Manufacture", Doi, JP 56–84337 (Jul. 9, 1981).
Japanese Patent Abstract—"Manufacture of Rotary Heat Accumulation Type Ceramic Heat Exchange Body" JP 01–147291 Yamada et al. (Jun. 8, 1989).
Japanese Patent Abstract—"Production of Low Thermal Expansion Cordierite", Morinaga et al., JP 02–111659 (Apr. 24, 1990).
Japanese Patent Abstract—"Porous Ceramic for Adsorption of Oils" Yokoyama et al., JP 01–61368 (Mar. 8, 1989).
Japanese Patent Abstract—"Cordierite Honeycomb Structure and Production Thereof", Harada et al. JP 64–3067 (Jan. 6, 1989).
Japanese Patent Abstract—"Production of Cordierite Ceramic Honeycomb Catalytic Body", Yamada et al. JP 62–4441 (Jan. 10, 1987).

*Primary Examiner*—Paul Marcantoni
*Attorney, Agent, or Firm*—Oblon, Spivak, McClelland, Maier & Neustadt, P.C.

[57] ABSTRACT

A low thermal expansion cordierite aggregate, which consists mainly of cordierite crystals having a mean crystal diameter of at least 50 μm and has little orientation in the crystal structure, shows hysteresis in its thermal expansion property accompanying a rise and fall of the temperature, and has a mean thermal expansion coefficient within a temperature range of from room temperature to 1000° C. of at most $10 \times 10^{-7}$/°C.

7 Claims, 1 Drawing Sheet

U.S. PATENT DOCUMENTS

| | | | |
|---|---|---|---|
| 3,940,255 | 2/1976 | Harrington et al. | 501/9 |
| 3,979,216 | 9/1976 | Fritsch, Jr. et al. | 501/119 |
| 4,063,955 | 12/1977 | Fritsch, Jr. et al. | 501/9 |
| 4,280,845 | 7/1981 | Matsuhisa et al. | 501/119 |
| 4,295,892 | 10/1981 | Matsuhisa et al. | 501/119 |
| 4,435,512 | 3/1984 | Ito et al. | 501/118 |
| 4,722,916 | 2/1988 | Watanabe et al. | 501/118 |
| 4,851,376 | 7/1989 | Asani et al. | 501/119 |
| 4,950,628 | 8/1990 | Landon et al. | 501/118 |
| 5,001,086 | 3/1991 | Carrier et al. | 501/9 |
| 5,073,178 | 12/1991 | Mimori et al. . | |
| 5,114,644 | 5/1992 | Beall et al. | 501/119 |
| 5,171,491 | 12/1992 | Kim et al. . | |

FOREIGN PATENT DOCUMENTS

| | | | |
|---|---|---|---|
| 57-20269 | 4/1982 | Japan . | |
| 0203767 | 11/1984 | Japan | 501/118 |
| 2-111659 | 4/1990 | Japan . | |
| 1456456 | 11/1976 | United Kingdom | 501/9 |

LOW THERMAL EXPANSION CORDIERITE AGGREGATE AND ITS BONDED BODY

DISCUSSION OF BACKGROUND

1. Field of the Invention

The present invention relates to a low thermal expansion cordierite aggregate useful for a filter for a high temperature dust-containing gas and its bonded body.

2. Discussion of Background

A cordierite ceramics has not only a refractoriness of at least 1300° C. but also a small thermal expansion coefficient and an excellent thermal spolling resistance. By virtue of these properties, it is used as a honeycomb catalyst carrier for cleaning an exhaust gas from an automobile. On the other hand, application of a cordierite ceramics to a filter for removing particulates from a diesel exhaust gas and for removing dusts from a high temperature coal combustion flue gas has been studied.

As general methods for producing cordierite ceramics, a firing method or a glass ceramic method is adopted. In the former method, a molded body made of powders such as clay, talc and alumina powders is fired to form cordierite crystals by simultaneous sintering and a solid phase reaction. In the latter method, glass particles obtained by the sol-gel method or by the melt cooling method is crystallized to obtain cordierite aggregates, and the cordierite aggregates obtained are used as a main starting material and, such material is molded and bonded (here the term "bonded" means not only sintered but also solidified with a binder such as a cement) are known.

There are two cordierite crystal phases, one is an α-type (a hexagonal system) and the other is a β-type (an orthorhombic system). It is known that either cordierite crystal has negative thermal expansion in the direction of the c-axis and about the same positive thermal expansion in the directions of the other axes.

A mean thermal expansion coefficient within a temperature range of from room temperature to 1000° C. (hereinafter referred to as a mean thermal expansion coefficient) of a cordierite ceramics obtained by a conventional method is usually within a range of from $20\times10^{-7}$ to $25\times10^{-7}$/°C., which is almost equal to the arithmetic mean of the above-mentioned thermal expansion coefficients in the directions of respective crystallographic axes.

It is also known that when powder materials consisting of flaky particles of cleavable crystals such as clay minerals are extruded into a honeycomb form and fired, a sintered body will be obtained wherein the c-axes of the cordierite crystals, in which direction the cordierite crystals have a negative thermal expansion coefficient, are oriented in parallel to the wall surface of the extruded honeycomb. And the sintered body shows a small mean thermal expansion coefficient of at most $14\times10^{-7}$/°C., occasionally of at most $5.6\times10^{-7}$/°C. in the direction parallel to the wall surface ("Ceramics", Vol 14, No. 11, pp. 967–976, 1979).

Japanese Examined Patent Publication No. 20269/1982 proposes a method for producing a low thermal expansion cordierite having a mean thermal expansion coefficient of at most $18\times10^{-7}$/°C. wherein glass particles having an approximate cordierite composition and a particle size of at least 1 mm are heated to 1320°–1410° C. to crystallize them into cordierite. In Examples of the Patent Publication, a cordierite aggregate having a mean thermal expansion coefficient as small as $13\times10^{-7}$/°C. is obtained.

The cordierite ceramics produced by the method disclosed in the Patent Publication has little orientated cordierite crystal structure and has a mean thermal expansion coefficient remarkably smaller than other cordierite ceramics having no orientation in its crystal structure. However, a cordierite aggregate or a cordierite bonded body having a means thermal expansion coefficient of $13\times10^{-7}$/°C. can not be produced reproducibly by the method disclosed in the Patent Publication.

For production of a cordierite ceramics so-called crystallized glass, a method is employed wherein a component which forms crystal nuclei, such as $ZrO_2$, is incorporated into the starting material, and a glass body made of such material is maintained at a nucleation temperature to form many crystal nuclei and then maintained at such an elevated temperature so that the crystal nuclei grow, and it is converted to a crystallized glass composed of many fine crystals.

However, the crystallized glass obtained by this method has a conventional thermal expansion coefficient and it is composed of fine cordierite crystals, and crystals of mullite, proto-enstatite and cristobalite are liable to be formed during the crystallization.

When a cordierite ceramics filter in a form other than a honeycomb form such as a thick-walled cylinder is used for removing dust from a high temperature coal combustion flue gas, it is likely that flammable materials in the collected dust suddenly burn, and the resulting sudden rise in the temperature of the dust-containing gas gives the filter a serious thermal shock. In such a case, a cordierite ceramic filter having a mean thermal expansion coefficient larger than $13\times10^{-7}$/°C. is not necessarily adequate in respect of thermal spolling resistance, and there has been a problem that the filter cracks or breaks whereby the whole system has to be suspended.

Namely, with respect to conventional cordierite ceramics, only when a honeycomb is extruded to orientate the c-axis of the crystals, a bonded body having a small mean thermal expansion coefficient of at most $10\times10^{-7}$/°C. can be obtained. With respect to a thick-walled cordierite ceramics, a practical bonded body having a small mean thermal expansion coefficient of about $10\times10^{-7}$/°C. has not been known yet.

Japanese Unexamined Patent Publication No. 111659/1990 proposes a method for preparing a low thermal expansion cordierite composed of a single phase of α-cordierite, wherein a mixture having a cordierite composition is heated to melt and then cooled at a rate of less than 1.5° C./second to a level of from 900° to 1100° C. and maintained at this temperature. However, the method has a tendency to accompany crystallizations of mullite, proto-enstatite and cristobalite which enhance thermal expansion coefficient of cordierite ceramics.

The Unexamined Patent Publication also reports that cordierite having a mean thermal expansion coefficient as small as $8.8\times10^{-7}$/°C. is obtained by crystallizing a melt containing 5% by weight of $ZrO_2$ as a crystal nucleating agent at 1000° C. for 4 days. However, it is reasonable to presume that the cordierite has a crystal structure much smaller than 50 μm due to addition of the nucleating agent, and it is not clear why the cordierite has such a small mean thermal expansion coefficient.

The measured values are likely to include considerable errors, since alumina, which has a large mean thermal expansion coefficient, is used as a reference specimen in the measurement of the mean thermal expansion coefficient. In any case, the method which requires to maintain the melt at 1000° C. for a period as long as 4 days (96 hours) lacks in practicability.

SUMMARY OF THE INVENTION

The object of the present invention is to provide a cordierite aggregate having a small mean thermal expansion coefficient of at most $10 \times 10^{-7}$/°C. without orientating the crystallographic axes of cordierite crystals, and a cordierite bonded body having a similar small mean thermal expansion coefficient, even if it has a thick-walled form or any complicated form.

The present invention has been made to solve the above-mentioned problems and provides a cordierite aggregate which consists mainly of cordierite crystals having a mean crystal diameter of at least 50 μm and little orientation in the crystal structure, shows hysteresis in its thermal expansion property during a rise and fall in the temperature, and has a mean thermal expansion coefficient of at most $10 \times 10^{-7}$/°C.

Figure 1:
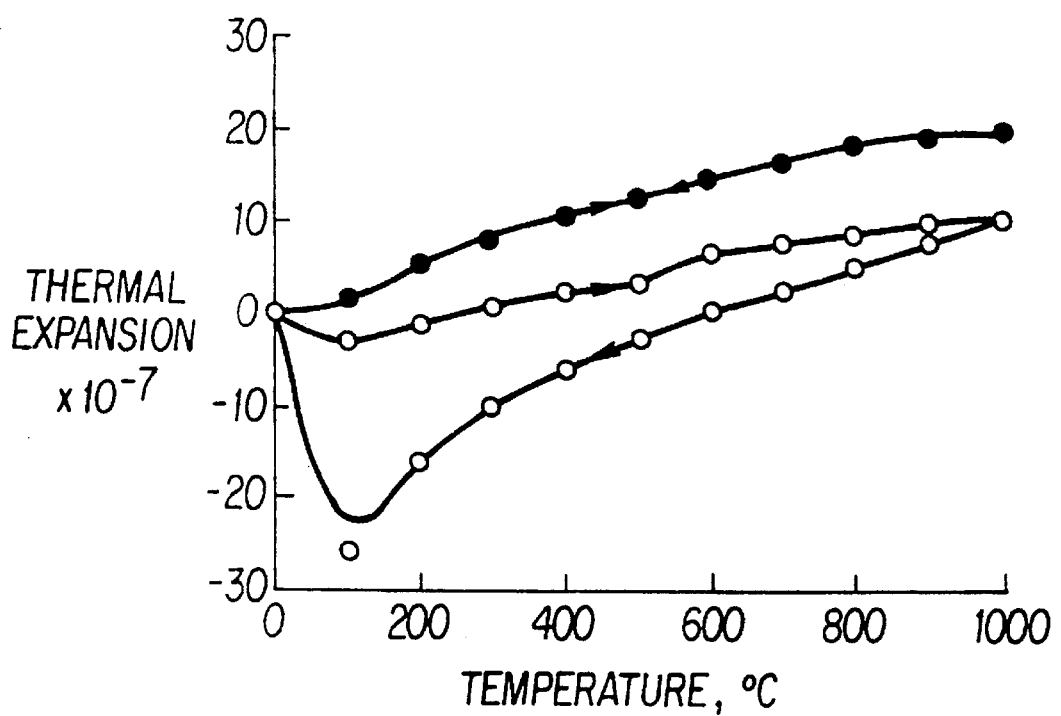
FIG. 1 is a graph showing thermal expansion properties of two cordierite bonded bodies within a temperature range of from room temperature to 1000° C., one is a cordierite sintered body (bonded body) of the present invention and the other is a conventional cordierite sintered body (bonded body).

Here, the term bonded body refers to not only a sintered body of which the main starting material is aggregates, but also an unfired and solidified body prepared by bonding aggregates as the main starting material with an alumina cement or the like, and the term aggregate refers to a particulate substance to be used as the main starting material of a bonded body. According to the present invention, a bonded body can be obtained which has a small mean thermal expansion coefficient even if it has not a thin-walled form like a honeycomb, but has a thick-walled form, or even if the cordierite crystal structure has little orientation.

The reason why the crystals in the aggregate are defined to have little orientation in the crystal structure, i.e. not defined to have no orientation in the crystal structure, is because even if crystals formed in the vicinity of the surfaces of the aggregate particles are orientated to some extent, it is possible to obtain an aggregate having a small mean thermal expansion coefficient without problem. Namely, when a glass particle is crystallized, there is a tendency that crystal nuclei are produced at the surfaces of the glass particles and cordierite crystals grow toward inside of the glass particles, since there is usually a crystal face in which crystals easily grow. Therefore, orientated crystals are partly present in the vicinity of the surfaces of the aggregate. The aggregate of the present invention includes an aggregate having such a partial crystal orientation.

The feature of the cordierite aggregate of the present invention is that the cordierite crystals in the aggregate has a mean crystal diameter as large as at least 50 μm, preferably at least 80 μm, more preferably at least 400 μm. When a thin specimen of the aggregate or the bonded body composed mainly of the aggregates is observed under polarized light of a polarizing microscope, each crystal particle can be distinguished clearly due to birefringence of the cordierite crystals.

It is difficult to accurately determine a mean crystal diameter of cordierite crystals in an aggregate. Accordingly, in the present invention, the mean crystal diameter is determined as follows. Namely, a thin specimen of an aggregate or a bonded body having a thickness of about 20 μm is prepared, and then an enlarged photograph of the specimen is taken under polarized light of a polarizing microscope.

Then, a circle having an appropriate area is drawn on the enlarged photograph, and the long diameter and the short diameter of each crystal particle in the circle (every crystal particle so long as half or more of the crystal section is present in the circle) are measured in the order of crystal size, and the mean value of both diameter is taken as the crystal diameter. On the assumption that a section of each crystal particle is circular, the section areas of the crystals in the photograph are cumulated in the order of decreasing crystal size and graphed out. The crystal diameter, at which the areas of the crystal particles cumulated on the graph correspond to a half the area of the circle drawn on the photograph, is taken as the mean crystal diameter.

In the present invention, the mean crystal diameter of cordierite crystals in the aggregate is at least 50 μm which is remarkably larger than that in conventional cordierite aggregate, and it is accordingly possible to obtain an aggregate having a small mean thermal expansion coefficient. Namely, when cordierite crystals in the aggregate have a large mean crystal diameter, and an attention is drawn to a single crystal in the aggregate, such a single crystal has a small thermal expansion coefficient (including negative one) in one direction and a large thermal expansion coefficient in another directions, due to anisotropic thermal expansion inherent to the cordierite crystal. At elevated temperature from 1100° to 1420° C., where a glass particle is crystallized, cordierite crystals in the cordierite aggregate are bonded to one another at their interface. When it is cooled to room temperature, the crystal shows large thermal shrinkage in the direction of the respective crystallographic axes having large thermal expansion coefficients while shows thermal expansion in the axial direction having a negative thermal expansion coefficient. In such a case, it is considered that if the thermal shrinkage exceeds a certain degree, many microcracks will be formed in the direction perpendicular to the crystallographic axes having a large thermal expansion coefficients, due to a large tensile stress generated in the cordierite crystal and at its interfaces. The microcracks may heal and disappear, when the temperature of the aggregate becomes above 1000° C. However, below the healing temperature, the microcracks serve to absorb thermal expansion in the direction of the crystallographic axes with large thermal expansion coefficients, whereby macroscopically the aggregate shows a small mean thermal expansion coefficient in the all directions which is near to that of the crystallographic axes having the small thermal expansion coefficient. In this way, an aggregate consisting of cordierite crystals having no orientation in the crystal structure shows a remarkably small mean thermal expansion coefficient, and a bonded body containing such aggregates likewise shows a small mean thermal expansion coefficient even if it is a thick-walled one.

It is considered that hysteresis in the thermal expansion property of the cordierite aggregate or its bonded body appears when a phenomenon that microcracks are formed in cordierite crystals and then disappear at least partially on reheating, is taking place. Hysteresis in the thermal expansion property is represented in a graph as a gap between a heating curve and a cooling curve as shown in FIG. 1, and indicates that at the time of cooling, the cooling curve does not trace the heating curve. The microcracks are not enlarged by repetition of heating and cooling, and the strength and the mean thermal expansion coefficient of a bonded body consisting of the cordierite aggregates do not change with time.

Although such hysteresis in the thermal expansion property does not appear in conventional cordierite ceramics, it is known that such hysteresis appears in an aluminum titanate aggregate, which crystal has extremely anisotropic thermal expansions. However, if the mean crystal diameter of cordierite crystals in a cordierite aggregate is as large as at least 50 µm, the aggregate shows hysteresis in its thermal expansion property. In this case, the presence of microcracks leads to a decrease in modulus of elasticity of the aggregate or its bonded body and contributes to improve the thermal spolling resistance.

Thus, when the mean crystal diameter of cordierite crystals in the aggregate is at least 50 µm, preferably at least 80 µm, the mean thermal expansion coefficient of the cordierite aggregate or its bonded body is as small as at most $10 \times 10^{-7}/°C$., preferably as small as at most $9 \times 10^{-7}/°C$. When the mean crystal diameter of cordierite crystals in the aggregate becomes at least 400 µm, the cordierite aggregate or its bonded body has a further reduced mean thermal expansion coefficient of at most $7 \times 10^{-7}/°C$., and thus shows further improved thermal spolling resistance in combination with the above-mentioned effect of reducing modulus of elasticity.

The theoretical composition of cordierite $2MgO.2Al_2O_3.5SiO_2$ corresponds to a chemical composition of 51.4% by weight of $SiO_2$, 34.9% by weight of $Al_2O_3$ and 13.7% by weight of MgO. With respect to the aggregate composed of cordierite crystals of the present invention, it is possible to obtain an aggregate or its bonded body showing a remarkably small mean thermal expansion coefficient, when the chemical composition of previous glass particles is within a range of, for example, 49 to 52% by weight of $SiO_2$, 33 to 37% by weight of $Al_2O_3$ and 13 to 16% by weight of MgO.

If the chemical composition of glass particles is outside the range, other crystals having large mean thermal expansion coefficients such as mullite, spinel and tridymite are likely to be produced in the aggregate at the time of crystallization. At the same time, these crystals suppress growth of cordierite crystals so that the mean crystal diameter of the cordierite crystals is decreased, whereby the mean thermal expansion coefficient of the cordierite aggregate or its bonded body tends to increase.

On the other hand, if a melt having the cordierite composition is cooled slowly, the resulting cordierite aggregate has a large mean thermal expansion coefficient due to generation of other crystals having a large thermal expansion coefficient such as mullite. Therefore, it is preferred to cool the melt rapidly at a rate of at least 300° C./hr below the glass transition point (780° C.), to produce glass particles having the cordierite composition.

In glass particles having the cordierite composition, majority of crystal nuclei are formed on the surfaces from which the crystals grow toward the inside of the glass particles. Accordingly, in order to reduce the proportion of crystallization in the vicinity of the surfaces which results in small crystal diameters, the glass particles before heat treatment are required to have a particle size of at least about 1 mm, so that the cordierite crystals in the aggregate will have a mean crystal diameter of at least 50 µm, preferably at least 80 µm. It is preferred that the glass particles to be crystallized have a particle size of at least 3 mm, more preferably at least 5 mm to decrease the mean thermal expansion coefficient of the resulting aggregate.

Glass particles having a small number of defects are almost transparent and colorless, since they have a small number of defects such as oxygen vacancy defects, cracks, impurities and blisters. If a large number of these defects are present, a lot of crystal nuclei are formed and growth of crystals is inhibited, whereby the mean crystal diameter becomes small and the mean thermal expansion coefficient becomes large. Glass particles having a small number of defects can be obtained, for example, by melting starting raw materials of high purities completely without contaminating the melt by carbon of electrodes or by wall substances of a crucible at the time of the melting, and rapidly cooling the melt so as not to introduce blisters inside. To obtain glass particles containing a small number of defects while avoiding inclusion of impurities, it is preferred to employ, for example, the melting method proposed in U.S. Pat. No. 5,171,491 wherein a plasma torch is used.

Crystallization of glass particles into cordierite begins at a temperature of at about 900° C. At the time of crystallization, it is preferred to control the number of crystal nuclei from which crystals grow, by elevating and passing the temperature of about 900° C. rapidly where a lot of crystal nuclei may otherwise form, to the temperature where growth of crystals proceeds (about 1000° C.) in order to increase the mean crystal diameter of the cordierite crystals and decrease the mean thermal expansion coefficient of the aggregate. Glass particles are crystallized preferably at a temperature of at least 1100° C., more preferably at least 1250° C., to quickly complete crystallization. When glass particles are crystallized, cordierite crystals of α-type are formed at a temperature above 1000° C., and the crystallization is accelerated as the temperature rise. At 1250° C. or above, transformation of the crystals from α-type to β-type takes place together with crystallization of β-type cordierite crystals. If β-type cordierite crystals of co-exists, a diffraction peak specific to the β-type crystals is distinctly detected at 2θ=29.633° by the X-ray diffraction using CuKα-ray. It is preferred from the practical viewpoint that the cordierite crystals to be formed in the aggregate contain at least 50% by weight of the β-type crystals in addition to the α-type crystals, more preferably at least 70% by weight of the β-type crystals. Because at elevated temperatures, the β-type crystals are more stable than α-type crystals.

At the time of crystallization of glass particle into cordierite crystals, it is preferred to control the temperature for crystallization at a level of at most 1420° C., since if the crystallization is conducted at a temperature exceeding 1430° C., cordierite crystals tend to decompose into mullite crystals and a liquid phase, whereby the mean thermal expansion coefficient will increase.

If the particle size of the cordierite aggregates to be used as the starting material of the bonded body is small, the effect of reducing the mean thermal expansion coefficient due to the presence of microcracks will be lost, and the mean thermal expansion coefficient will be large. Accordingly, it is possible to obtain a bonded body having a very small mean thermal expansion coefficient by using coarse cordierite aggregates containing a lot of microcracks as it is. It is also possible to control the mean thermal expansion coefficient of the bonded body by selecting the particle size of the aggregates to be used as a starting material. To obtain a cordierite bonded body such as a filter by using the cordierite aggregates of the present invention as a starting material, it is possible to employ, for example, the method disclosed in Japanese Unexamined Patent Publication No. 68411/1991 wherein cordierite aggregates crystallized from a glass is used.

The Unexamined Patent Publication discloses a method wherein 60% by weight of cordierite aggregates having particle sizes of 74 to 590 μm, 25% by weight of particles having particle sizes of at most 74 μm prepared by crushing the same cordierite aggregates, 10% by weight of clay, 5% by weight of a β-spodumene powder (at most 43 μm) to provide high strength to the resulting sintered body up to a high working temperature and an organic binder are mixed. When a sintered body having a large porosity is required, a coke powder which forms pores when burned off is added to a mixture of starting material and the resulting mixture is molded into a cylindrical filter form, for example, by an isostatic press and then fired.

In this case, if the sintered body contains at least 60% by weight of the aggregates having a small mean expansion coefficient, the resulting bonded body will have a small mean thermal expansion coefficient close to that of the aggregates, namely at most $10\times10^{-7}/°C$., preferably at most $9\times10^{-7}/°C$. In the cordierite bonded body of the present invention, the pitch coke powder mixed to form pores is omitted from the weight of the resulting bonded body at the time of calculating a percentage of each component of the bonded body, since it is burned off.

Now, the present invention will be described in further detail with reference to Examples. However, it should be understood that the present invention is by no means restricted by such specific Examples.

Examples 1, 2, 8, 9, 12, 18 to 20 and 24 to 28 are Comparative Examples and Examples 3 to 7, 10, 11, 13 to 17 and 21 to 23 are the working Examples of the present invention.

EXAMPLES 1 TO 5

High-purity silica sand, low-soda alumina and high-purity magnesia clinker were mixed to obtain a starting mixture having a cordierite composition. The starting mixture was put in a crucible made of a high zirconia fused cast brick (X-950; manufactured by Asahi Glass Company Ltd.) and heated in an electric furnace at 1700° C. for one hour to melt it. The crucible was slanted, and the melt was poured into cold water and quenched to obtain almost transparent and colorless glass particles containing a small number of defects.

The glass particles having the cordierite composition thus obtained were classified into glass particles having particle sizes of at most 0.15 mm, from 0.15 to 0.3 mm, from 1 to 2 mm, from 2 to 5 mm and at least 5 mm by means of sieves.

the glass particles classified into respective particle sizes were put in an electric furnace, and the temperature was elevated at 200° C./hr and maintained at 1380° C. for 5 hours to obtain aggregates crystallized into cordierite. Each aggregate was crushed to adjust the particle size to 75 to 150 μm, and polyvinyl alcohol was added thereto as a binder. The resulting mixture was press-molded under a pressure of 500 kg/cm². Each molded body was put in an electric furnace, heated at a temperature raising rate of 200° C./hr and sintered at 1420° C. for 5 hours to obtain a sintered body having a size of 40 mm×20 mm×10 mm.

A cylinder specimen of 5 mm in outer diameter and 20 mm in length was prepared from each of the sintered bodies thus obtained was cut and thermal expansion property between room temperature and 1000° C. was examined. A thin specimen of each sintered body was prepared and microphotographed under polarized light to determine the mean crystal diameter of cordierite crystals in each aggregate. The results are shown in Table 1.

EXAMPLE 6

A sintered body was prepared in the same manner as in Example 5 except that the particle size of the aggregate to be bonded was adjusted from 420 to 500 μm. A cylinder specimen for examination of the thermal expansion property, and a thin specimen was prepared from the sintered body. The thermal expansion property and the mean crystal diameter were determined. The results are shown in Table 1.

EXAMPLE 7

To examine the thermal expansion property of the aggregate which is not crushed (crystallized glass), the melt in the crucible was cast on a cold iron plate to prepare a glass plate having a cordierite composition with a thickness of about 8 mm. The glass plate was heat-treated under the same conditions as in Example 5 to crystallize into cordierite. A cylinder for examination of the thermal expansion property, and a thin specimen was prepared from the crystallized glass plate. The test results are shown in Table 1.

TABLE 1

| Example | Particle size of glass particles (mm) | Mean crystal diameter (μm) | Mean thermal expansion coefficient (×10⁻⁷/°C.) | Presence or absence of hysteresis |
| --- | --- | --- | --- | --- |
| 1 | At most 0.15 | 30 | 19 | Absent |
| 2 | 0.15 to 0.3 | 40 | 14 | Absent |
| 3 | 1 to 2 | 70 | 9 | Present |
| 4 | 2 to 5 | 90 | 8 | Present |
| 5 | At least 5 | 130 | 6.8 | Present |
| 6 | At least 5 | 400 | 5 | Present |
| 7 | Plate of about 8 mm in thickness | 100 | 3 | Present |

Utilizing a cylindrical quartz glass having about the same size as a standard test specimen, the mean thermal expansion coefficient of each sintered body was obtained by correcting the measured value with the thermal expansion of the quartz glass. Each thermal expansion coefficient in Table 1 includes an error of $\pm1\times10^{-7}/°C$.

The mean crystal diameters of cordierite crystals in the aggregates were determined by the above-mentioned method wherein thin specimens of the sintered bodies and the crystallized glass were microphotographed under polarized light and the sizes of the crystal particles in the photographs were measured. At the time of determination of each mean thermal expansion coefficient, the presence or absence of hysteresis, which is believed to occur as a result of appearance and disappearance of microcracks, was also checked and the results are shown in Table 1.

The effect of repetitious heating and cooling of a sintered body on the mean thermal expansion coefficient was examined with respect to the sintered bodies of Examples 3 to 5. Heating and cooling cycles at a rate of 100° C./min between 100° C. and 900° C. was repeated 100 times. The mean thermal expansion coefficients did not substantially change, and the thermal expansion property showed reproducible hysteresis.

EXAMPLES 8 TO 11

To examine the effect of the cooling rate at the time of cooling the melt on the mean thermal expansion coefficient of the aggregate, the afore-mentioned starting material having a cordierite composition was put in a platinum crucible and melted by heating at 1600° C. for one hour and the melt was cooled to the glass transition point or below at various rates. Each of the resulting glasses was crystallized and sintered body was prepared by using in the same manner as in Example 5 and thermal expansion property of each sintered body was examined. The results are shown in Table 2.

TABLE 2

| Example | Cooling rate of the melt (°C./hr) | Mean thermal expansion coefficient (×10⁻⁷/°C.) |
| --- | --- | --- |
| 8 | 50 | 18.1 |
| 9 | 80 | 16.5 |
| 10 | 350 | 9.3 |
| 11 | 500 | 9.5 |

EXAMPLES 12 TO 18

To examine the effect of the temperature for crystallization of glass particles on the mean thermal expansion coefficient, the afore-mentioned starting material having a cordierite composition was put in a platinum crucible and melted by heating at 1600° C. for one hour. The melt was poured into cold water. The resulting glass particles having particle sizes of at least 5 mm were crystallized by heating at 1000° C., 1100° C., 1300° C., 1350° C., 1380°, 1400° and 1430° C. for 2 hours. Each of the resulting aggregates was crushed and sieved to adjust its particle size from 75 to 150 μm, and a sintered body was prepared in the same manner as in Example 5. The mean thermal expansion coefficient of each sintered body was determined, and the results are shown in Table 3.

The sintered body of Example 16 has a relatively large mean thermal coefficient as compared with the sintered body of Example 5. This may be explained as follows. As a result of about 100° C. lower glass-melting temperature, relatively large number of defects, which would serve as crystal nuclei, were formed in the glasses, whereby the mean crystal diameter of the cordierite crystals were reduced. Each composition of crystal phases is also checked by X-ray powder diffraction method.

TABLE 3

| Example | Crystallization temperature of glass particles (°C.) | Mean thermal expansion coefficient of sintered body (×10⁻⁷/°C.) | Composition of crystal phases |
| --- | --- | --- | --- |
| 12 | 1000 | 11.0 | α-type |
| 13 | 1100 | 8.4 | α-type |
| 14 | 1300 | 8.0 | β>>α |
| 15 | 1350 | 8.0 | β-type |
| 16 | 1380 | 8.1 | β-type |
| 17 | 1400 | 8.0 | β-type |
| 18 | 1430 | 12.0 | β>>mullite |

EXAMPLES 19 TO 23

To examine the effect of the particle size of the aggregate to be used as a main starting material of a cordierite bonded body on the mean thermal expansion coefficient, the aggregate prepared in the same manner as in Example 5 was crushed and classified to adjust particle sizes to at most 3 μm, from 20 to 50 μm, from 50 to 75 μm, from 75 to 150 μm and from 200 to 300 μm. By using the aggregate of each classified particle, a sintered body was prepared in the same manner as in Example 5. The mean thermal expansion coefficient of each sintered body was determined. The results are shown in Table 4.

The results in Table 4 indicate that a mean thermal expansion coefficient of a sintered body can be adjusted by changing the mean particle size of cordierite aggregates used as the main starting material of the bonded body. It can be seen that it is necessary to use aggregates having a mean particle size of at least 50 μm (the mean crystal diameter is always smaller than the mean particle size of aggregates) to obtain a sintered body having a mean thermal expansion coefficient of at most $10 \times 10^{-7}$/°C.

TABLE 4

| Example | Particle size of aggregate (μm) | Mean thermal expansion coefficient (×10⁻⁷/°C.) |
| --- | --- | --- |
| 19 | At most 3 | 20 |
| 20 | 20–50 | 16.0 |
| 21 | 50–75 | 9.5 |
| 22 | 75–150 | 7.0 |
| 23 | 200–300 | 5.5 |

EXAMPLES 24 TO 28

A mixed starting material having the cordierite composition was melt in an electric furnace having graphite electrodes, and the melt was poured into water to obtain gray glass particles containing oxygen vacancy defects. The glass particles were crushed and classified to adjust the particle sizes to from 0.075 to 0.15 mm, from 0.5 to 1 mm, from 1 to 2 mm, from 5 to 10 mm and from 20 to 30 mm. Glass particles having each particle size were crystallized and then made into a sintered body in the same manner as in Examples 1 to 5. The mean thermal expansion coefficients of the resulting sintered bodies were determined, and the results are shown in Table 5. The color of the glass particles disappeared upon crystallization, and the gray glass particles changed into colorless aggregates. Each mean crystal diameters of cordierite crystals of the resulting aggregates were as small as a few μm, and the mean thermal expansion coefficients of all sintered bodies were larger than $18 \times 10^{-7}$/°C. This is because a lot of defects in the glass particles served as crystal nuclei, whereby the mean crystal diameter of cordierite was reduced.

TABLE 5

| Example | Particle size of glass particles (mm) | Mean thermal expansion coefficient of sintered body (×10⁻⁷/°C.) |
| --- | --- | --- |
| 24 | 0.075–0.15 | 19.0 |
| 25 | 0.5–1 | 19.2 |
| 26 | 1–2 | 19.6 |
| 27 | 5–10 | 19.2 |
| 28 | 20–30 | 19.6 |

FIG. 1 shows thermal expansion properties of a cordierite sintered body of the present invention obtained in Example 3 and a conventional cordierite sintered body obtained in Example 26 (Comparative Example) within a temperature range of from room temperature to 1000° C. The cordierite sintered body of Example 3 shows hysteresis (gap in traces) between the thermal expansion trace of temperature rise and the trace of temperature fall, and has a remarkably small mean thermal expansion coefficient. On the other hand, with respect to the conventional cordierite sintered body of Example 26, hysteresis was not observed, and the mean thermal expansion coefficient was large.

In the cordierite aggregate of the present invention or its bonded body, cordierite crystals have little orientation in the crystal structure. Nevertheless, since the mean crystal diameter of the cordierite crystals is at least 50 μm, preferably at least 80 μm, the aggregate or its bonded body has a small mean thermal expansion coefficient of at most $10\times10^{-7}/°C$., preferably at most $9\times10^{-7}/°C$. Therefore, even if the bonded body has a large thickness, it has a small mean thermal expansion coefficient and an excellent thermal spolling resistance. Since the hysteresis in its thermal expansion property is stable to repeated heating and cooling, the cordierite aggregate of the present invention and its bonded body are suitable for such uses as a heat exchanger and a filter for high temperature gas.

Since the thermal expansion coefficient of the bonded body can be adjusted by changing the particle size of the cordierite aggregate, it is also possible to prepare a bonded body having a gradient thermal expansion coefficient which is convenient for complexing with other materials. When a melt having the cordierite composition is cooled rapidly to form a glass body, it is possible to obtain a crystallized glass body having a remarkably small mean thermal expansion coefficient, even if it has a large thickness. Further, it is possible to obtain an aggregate or its bonded body having a mean thermal expansion coefficient of at most $7\times10^{-7}/°C$., and to provide materials for high temperature use having a small elastic modulus and an extremely excellent thermal spolling resistance.

What is claimed is:

1. A low thermal expansion cordierite aggregate, which consists of cordierite crystals having a mean crystal diameter of at least 50 μm and almost no orientation in the crystal structure, shows hysteresis in its thermal expansion property accompanying a rise and fall of the temperature, and has a mean thermal expansion coefficient within a temperature range of from room temperature to 1000° C. of at most $10\times10^{-7}/°C$.

2. The low thermal expansion cordierite aggregate according to claim 1, wherein the cordierite crystals have a mean crystal diameter of at least 80 μm, and the mean thermal expansion coefficient within a temperature range of from room temperature to 1000° C. is at most $9\times10^{-7}/°C$.

3. The low thermal expansion cordierite aggregate according to claim 1, wherein the cordierite crystals have a mean crystal diameter of at least 400 μm, and the mean thermal expansion coefficient within a temperature range of from room temperature to 1000° C. is at most $7\times10^{-7}/°C$.

4. The low thermal expansion cordierite aggregate according to claim 1, wherein the cordierite aggregate is obtained by crystallizing glass particles having a small number of defects.

5. A low thermal expansion cordierite bonded body which consists of at least 60% by weight of cordierite aggregates and a bonding matrix of a powder source, shows hysteresis in its thermal expansion property accompanying a rise and fall in the temperature and has a mean thermal expansion coefficient within a temperature range of from room temperature to 1000° C. of at most $10\times10^{-7}/°C$., and the cordierite aggregate consists of cordierite crystals having a mean crystal diameter of at least 50 μm and has almost no orientation in the crystal structure.

6. The low thermal expansion cordierite bonded body according to claim 5, wherein the bonded body has a mean thermal expansion coefficient within a temperature range of from room temperature to 1000° C. of at most $9\times10^{-7}/°C$. and the cordierite crystals in the aggregates constituting the bonded body have a mean crystal diameter of at least 80 μm.

7. A low thermal expansion cordierite bonded body having a mean thermal expansion coefficient within a temperature range of from room temperature to 1000° C. of at most $10\times10^{-7}/°C$., prepared by rapidly cooling a melt consisting of a cordierite composition to form glass particles having a small number of defects, crystallizing the glass particles having particle sizes of at least 1 mm at from 1100° to 1420° C. into cordierite to obtain aggregates of cordierite crystals having a mean crystal diameter of at least 50 μm, and molding and bonding a powder mixture comprising at least 60% by weight of said aggregates and a powder constituting a bonding matrix.

* * * * *